United States Patent [19]

Takaiwa et al.

[11] Patent Number: 5,345,279
[45] Date of Patent: Sep. 6, 1994

[54] IMAGE SIGNAL PROCESSING APPARATUS WITH ANALOG TO DIGITAL IMAGE CONVERSION

[75] Inventors: Kan Takaiwa, Hachioji; Eiji Ohara, Kawasaki, both of Japan

[73] Assignee: Canon Kabushiki Kaisha, Tokyo, Japan

[21] Appl. No.: 748,889

[22] Filed: Aug. 23, 1991

[30] Foreign Application Priority Data

Aug. 30, 1990 [JP] Japan ................... 2-229675
Jun. 25, 1991 [JP] Japan ................... 3-153149

[51] Int. Cl.⁵ ............................................ H04N 5/18
[52] U.S. Cl. ............................ 348/689; 348/694; 348/696
[58] Field of Search ............... 358/169, 171, 172, 170, 358/34, 173, 174; 348/689, 691, 692, 694, 695, 696, 697; H04N 5/18

[56] References Cited

U.S. PATENT DOCUMENTS

| | | | |
|---|---|---|---|
| 4,642,696 | 10/1987 | George | 358/243 |
| 5,008,753 | 4/1991 | Kitaura et al. | 358/172 X |
| 5,084,700 | 1/1992 | Christopher | 358/172 X |
| 5,087,973 | 2/1992 | Kawahara | 358/171 X |
| 5,142,643 | 8/1992 | Yonejirou et al. | 358/172 X |

FOREIGN PATENT DOCUMENTS

| | | |
|---|---|---|
| 220894 | 6/1987 | European Pat. Off. |
| 0166689 | 7/1987 | Japan ................... 358/34 |
| 2228643 | 8/1990 | United Kingdom |

*Primary Examiner*—Victor R. Kostak
*Attorney, Agent, or Firm*—Fitzpatrick, Cella, Harper & Scinto

[57] ABSTRACT

An image signal processing apparatus wherein the black level of an analog image signal is adjusted by controlling the clamp level of the inputted analog image signal. The clamped analog image signal is digitalized. Using the digital image signal offset to a first level during the blanking period, the black level adjustment of the analog image signal is carried out. The first level during the blanking period of the digital image signal corresponding to the analog image signal with the black level having been adjusted, is changed to a second level, allowing a correct and easy black level adjustment using a simple circuit arrangement.

15 Claims, 4 Drawing Sheets

IMAGE SIGNAL PROCESSING APPARATUS WITH ANALOG TO DIGITAL IMAGE CONVERSION

BACKGROUND OF THE INVENTION

1. Field of the Invention

The present invention relates to an image signal processing apparatus, and more particularly to an apparatus for processing an analog color image signal after digitalizing it.

2. Related Background Art

Figure 1:
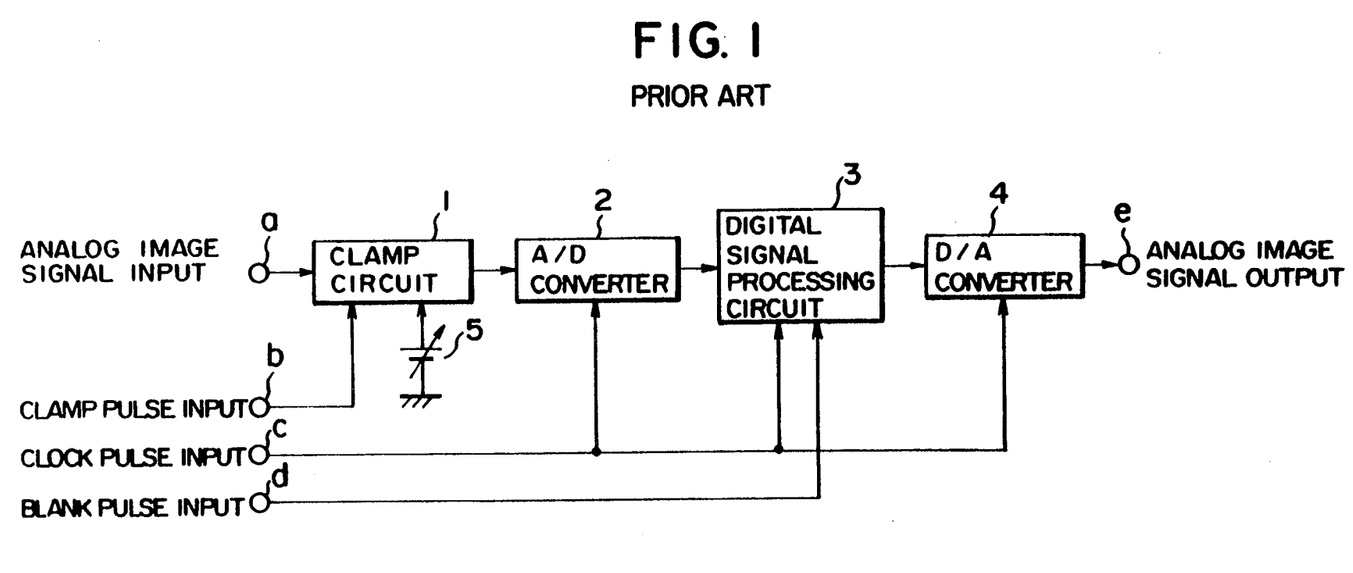
FIG. 1 shows the outline of the structure of a conventional image signal processing apparatus.

An image signal processing apparatus for processing an analog image signal after digitalizing it has a structure such as shown in FIG. 1.

In FIG. 1, reference numeral 1 represents a clamp circuit, 2 represents an A/D converter, 3 represents a digital signal processing circuit, 4 represents a D/A converter, and 5 represents a variable voltage source. The operation of this apparatus will be described below.

Referring to FIG. 1, an analog image signal inputted from an input terminal a is clamped to a clamp level by the clamp circuit 1 at the timing when a clamp pulse is entered from an input terminal b. The clamp level is preset by the variable voltage source 5.

The analog image signal clamped by the clamp circuit 1 is converted into a digital data by the A/D converter 2 synchronously with a clock pulse inputted from an input terminal c, and thereafter the digital data is supplied to the digital signal processing circuit 3.

The digital signal processing circuit 3 is supplied with the clock pulse inputted from the input terminal c as well as a blanking pulse inputted from an input terminal d. The digital signal processing circuit 3 converts the digital data supplied from the A/D converter 2 into a data which indicates "0" during the blanking period designated by the blanking pulse, and performs various digital signal processing. The processed signal is supplied to the D/A converter 4.

The digital data processed by the digital signal processing circuit 3 is converted into an analog image signal synchronously with the clock pulse inputted from the input terminal c, and thereafter the analog image signal is outputted from an output terminal e.

In the image signal processing circuit shown in FIG. 1, a so-called black level adjustment is carried out by adjusting a preset voltage level of the variable voltage source 5 and changing the clamp level so as to make the blanking level coincide with the black level of an inputted image signal. However, even if the black level of an inputted image signal becomes lower than the blanking level, the digital data outputted from the A/D converter 2 will not lower below "0", resulting in a hardship of adjusting the black level.

Furthermore, even if the minimum reference potential of the A/D converter 2 is arranged to be adjusted so as to match the level of an image signal to be inputted to the A/D converter 2, an error is likely to occur and the circuit becomes complicated, resulting in a hardship of adjusting the black level.

Figure 2:
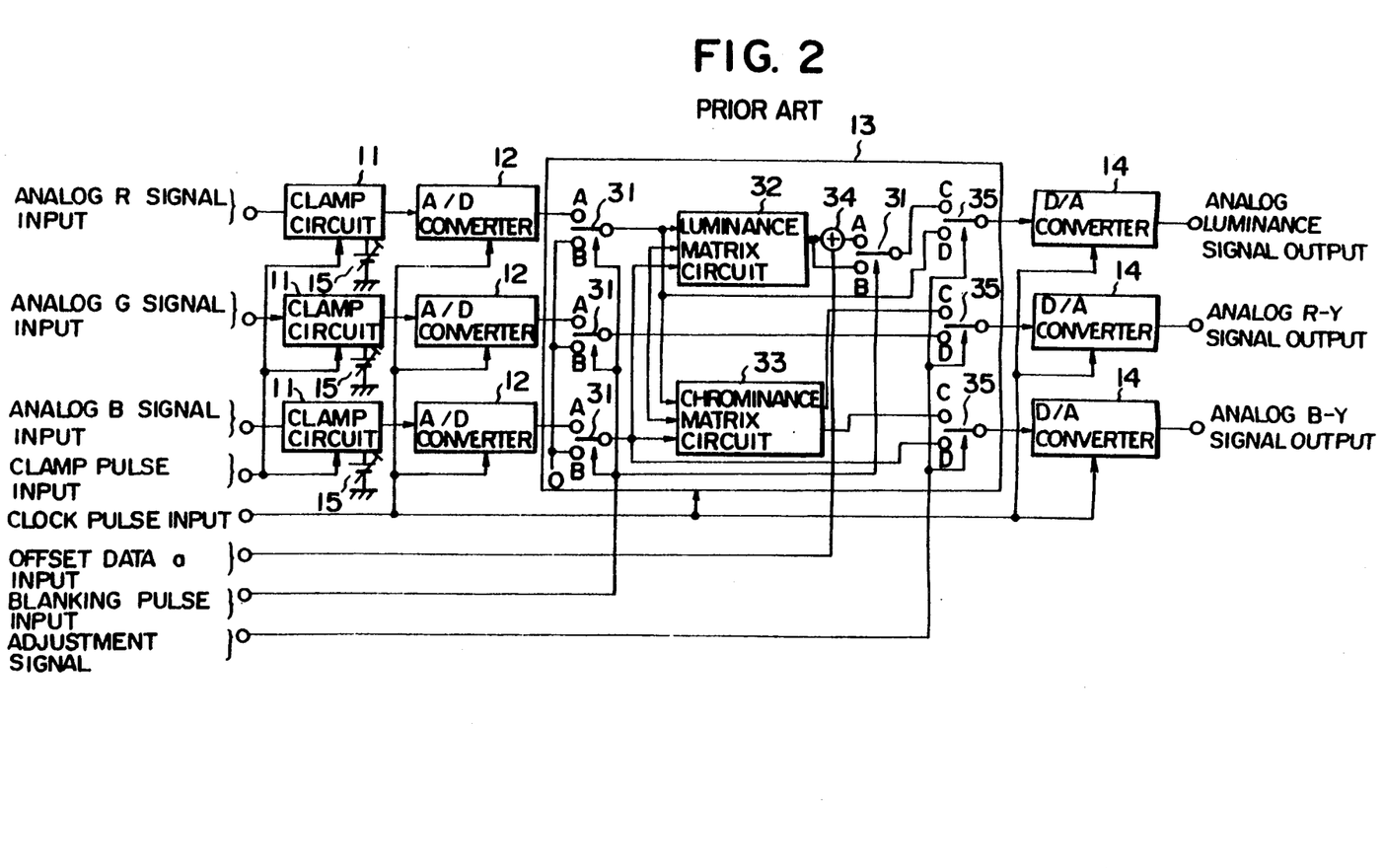
FIG. 2 shows the outline of the structure of another conventional image signal processing. apparatus.

An image signal processing apparatus for processing an analog color image signal after digitalizing it has the structure such as shown in FIG. 2.

In FIG. 2, reference numeral 11 represents a clamp circuit, 12 represents an A/D converter, 13 represents a digital signal processing circuit, 31 and 35 represent switches, 32 represents a luminance matrix circuit, 33 represents a chrominance matrix circuit, 34 represents an adder, 14 represents a D/A converter, and 15 represents a variable voltage source.

The operation of the apparatus shown in FIG. 2 will be described below.

Referring to FIG. 2, analog R, G, and B signals inputted from input terminals are clamped to clamp levels by the clamp circuits 11 at the timing when a clamp pulse is entered from an input terminal. The clamp levels are preset by variable voltage sources 15.

The analog R, G, and B signals clamped by the clamp circuits 11 are converted into digital data by the A/D converters 12 synchronously with a clock pulse inputted from an input terminal, and thereafter the digital data is supplied to the digital signal processing circuit 13.

The digital signal processing circuit 13 is supplied with the above-described clock pulse as well as a blanking pulse inputted from an input terminal. The digital signal processing circuit 13 converts the digital data supplied from the A/D converters 12 into data which indicates "0" during the blanking period designated by the blanking pulse by connecting the switches 31 controlled by the blanking pulse to B terminals shown in FIG. 2. The luminance matrix circuit 32 and chrominance matrix circuit 33 generates a digital luminance signal and R-Y and B-Y digital chrominance signals using the inputted digital data. The digital chrominance signals are supplied to the D/A converters 14 via switches 35 which are controlled by an adjustment signal supplied from an input terminal and connected to D terminals shown in FIG. 2 during the black level adjustment. During the period other than the blanking period, the digital luminance signal is supplied to the D/A convert 14 via the adder 34 and switch 31 controlled by the blanking pulse, the digital luminance signal being added with a data (e.g., a digital data representative of a voltage level "7") set by an offset data a entered from an input terminal so that the black level of the luminance signal relative to the blanking level is adjusted.

The digital luminance signal, R-Y and B-Y digital chrominance signals processed by the digital signal processing circuit 13 in the above manner are converted into analog image signals synchronously with the clock pulse inputted from the input terminal, and thereafter the analog image signals are outputted from output terminals.

In the image signal processing circuit shown in FIG. 2, during the black level adjustment, the R, G, and B digital signals indicating "0" during the blanking period are supplied to the D/A converters 14 by changing the connection of the switches 35 by the adjustment signal, and converted into analog image signals to be outputted. The voltage setting levels of the variable voltage sources 15 are adjusted by the levels of the outputted analog R, G, and B signals to thereby change the clamp levels. In this manner, the blank level is made to become coincident with the black levels of the analog R, G, and B signals inputted 1 from the input terminals, to thereby conduct the black balance adjustment between the luminance signal outputted from the luminance matrix circuit and the chrominance signals outputted from the chrominance matrix circuit 33.

As described above, in the image signal processing apparatus shown in FIG. 2, the voltage setting levels of the variable voltage sources 15 are adjusted to change the clamp levels such that the blanking level is made to become coincident with the black levels of the inputted analog R, G, and B, thereby conducting the black balance adjustment between the outputted luminance signal and analog R-Y and B-Y chrominance signals. However, even if the black levels of the inputted analog R, G, and B signals become lower than the blanking level during the black balance adjustment because of setting particular clamp levels, the digital data outputted from the A/D converter 12 will not lower below "0", resulting in a hardship of adjusting the black level.

Furthermore, even if the minimum reference potentials of the A/D converter 12 are arranged to be adjusted so as to match the levels of analog R, G, and B signals to be inputted to the A/D converters 2, an error is likely to occur and the circuit becomes complicated, resulting in a hardship of adjusting the black level.

SUMMARY OF THE INVENTION

It is an object of the present invention to provide an image signal processing apparatus capable of solving the above-described problems.

It is another object of the present invention to provide an image signal processing apparatus capable of adjusting the black level of an image signal correctly and easily using a simple circuit arrangement.

In consideration of the above objects, according to one aspect of the present invention, there is provided an image signal processing apparatus including: clamping means for clamping an inputted analog image signal to a desired clamp level; analog/digital converting means for converting the analog image signal clamped by the clamping means into a digital image signal; and digital signal processing means for offsetting the digital image signal outputted from the analog/digital converting means to a first level during a blanking period, adjusting the clamp level of the clamping means by using the digital image signal offset to the first level during the blanking period, to adjust the black level of the analog image signal, and changing the first level of the digital image signal corresponding to the analog signal with the black level having been adjusted, to a second level during the blanking period, and outputting the digital image signal having the second level.

It is a further object of the present invention to provide an image signal processing apparatus capable of adjusting the black levels of color image signals correctly and easily using a simple circuit arrangement.

In consideration of the above object, according to another aspect of the present invention, 10 there is provided an image signal processing apparatus including: clamping means for clamping an inputted analog color image signal to a desired clamp level; analog/digital converting means for converting the analog color image signal clamped by the clamping means into a digital color image signal; and digital signal processing means for offsetting the digital color image signal outputted from the analog/digital converting means to a first level during a blanking period, adjusting the clamp level of the clamping means by using the digital color image signal offset to the first level during the blanking period, to adjust the black level of the analog color image signal, and offsetting a digital luminance signal formed by the digital color image signal corresponding to the analog signal with the black level having been adjusted and offset to the first level during the blanking period, to a second level during the blanking period, and outputting the digital color image signal having the second level.

The above and other objects, and advantages of the present invention will become apparent from the following detailed description of the embodiments when read in conjunction with the accompanying drawings.

DETAILED DESCRIPTION OF THE PREFERRED EMBODIMENTS

The preferred embodiments of the present invention will be described below.

Figure 3:
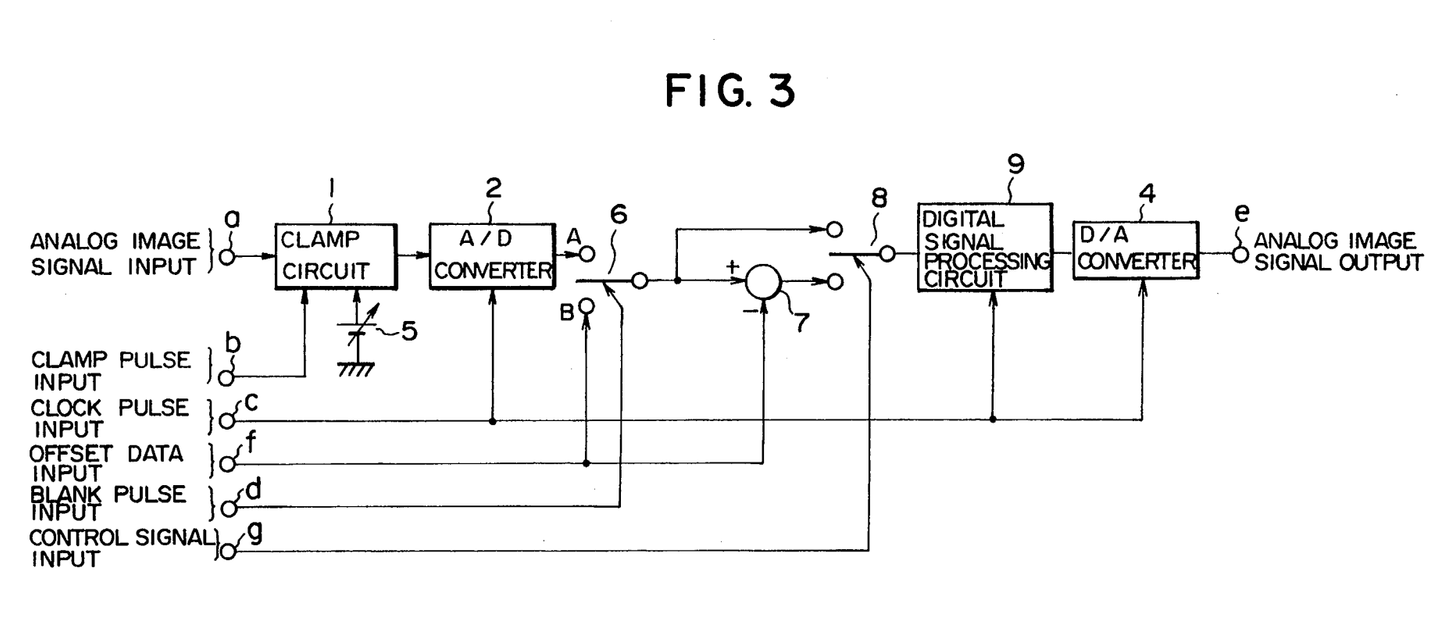
FIG. 3 shows the outline of the structure of an image signal processing apparatus according to a first embodiment of the present invention.

FIG. 3 shows the outline of the structure of an image signal processing apparatus according to a first embodiment of the present invention. In FIG. 3, like elements to those shown in FIG. 1 are represented by using identical reference numerals, and the detailed description thereof will be omitted.

Referring to FIG. 3, an analog image signal inputted from an input terminal a is clamped by a clamp circuit 1 and supplied to an A/D converter 2, in a similar manner as of FIG. 1. The digital data converted by the A/D converter is supplied to terminal A of a switch 6.

An offset data representative of a predetermined voltage level (e.g., a digital data representative of a voltage level "15") is supplied from an input terminal f to terminal B of the switch 6 which is activated by a blanking pulse entered from an input terminal d. The switch 6 is connected to terminal A during the period other than the blanking period so that the digital data from the A/D converter 2 is outputted. During the blanking period, the switch 6 is connected to terminal B so that the offset data is outputted.

In this manner, a digital data outputted from the switch 6 has a voltage level offset by a predetermined voltage level during the blanking period. Therefore, this digital data may have a lower level than the blanking level (in this case, the digital data representative of "15").

The digital data outputted from the switch 6 is supplied to terminal A of a switch and to the positive terminal of a digital subtracter 7.

To the negative terminal of the digital subtracter 7, there is supplied the offset data entered from the input terminal f. The digital data outputted from the digital subtracter 7 therefore has a level of the digital data outputted from the switch 6 and subtracted by the offset data. This digital data is supplied to a terminal B of the switch 8.

In the normal state, the switch 8 is connected to terminal B. Therefore, the digital data supplied to the digital signal processing circuit 9 has a level indicating "0" during the blanking period because the digital data at the switch 6 was offset and subtracted by the offset level by the digital subtracter 7. The digital signal processing circuit 9 performs various digital signal processing, and the processed signal is converted into an analog image signal by a D/A converter and outputted from an output terminal e.

During the black level adjustment of an inputted image signal, the switch 8 is connected to terminal A upon reception of a control signal entered via an input terminal g from a system controller (not shown). Therefore, the digital data at the switch 6 offset by the offset level during the blanking period is supplied to the digital signal processing circuit 9, and the analog image signal is outputted from the D/A converter 4. During the black level adjustment, it is possible to monitor a digital data having a lower level than the blanking level (i.e., "15"), allowing correct and easy black level adjustment.

In the above embodiment, although the blanking level is set to "15", this value may be set as desired. Furthermore, although the clamp circuit operates at the timing of a clamp pulse, this timing may be set in a different manner. For example, the clamp circuit may operate at the timing when a minimum potential such as a sink chip level of an inputted image signal is detected.

As described above, according to the present embodiment, the black level adjustment of an image signal can be performed correctly and easily using a simple circuit arrangement.

Figure 4:
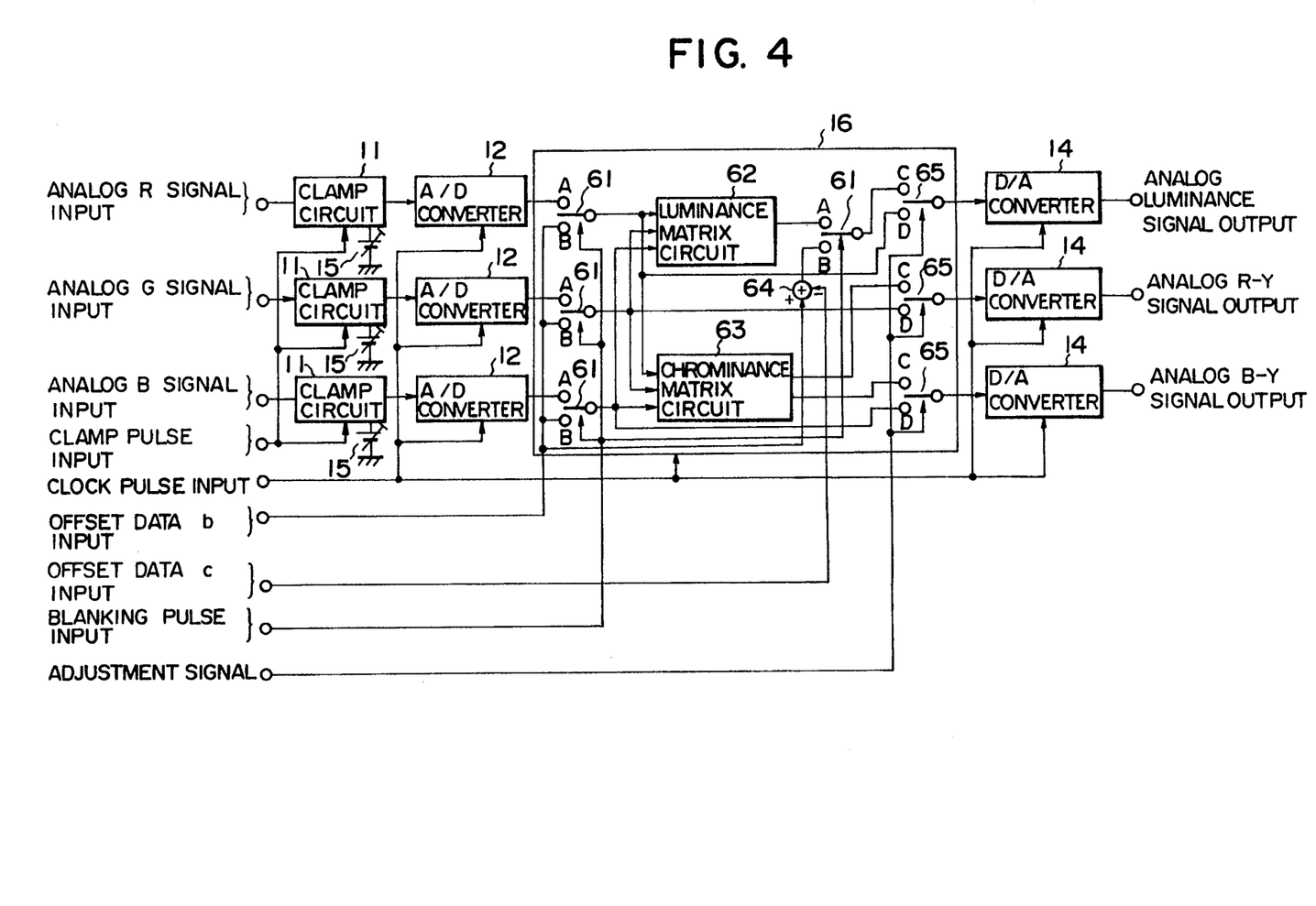
FIG. 4 shows the outline of the structure of an image signal processing apparatus according to a second embodiment of the present invention.

FIG. 4 shows the outline of the structure of an image signal processing apparatus according to a second embodiment of the present invention. In FIG. 4, like elements to those shown in FIG. 2 are represented by using identical reference numerals, and the detailed description thereof will be omitted.

Referring to FIG. 4, analog R, G, and B signals inputted from input terminals are clamped to clamp levels by clamp circuits 11 at the timing when a clamp pulse is entered from an input terminal. The clamp levels are preset by variable voltage sources 15.

The analog R, G, and B signals clamped by the clamp circuits 11 are converted into digital data by A/D converters 12 synchronously with a clock pulse input ted from an input terminal, and thereafter the digital data is supplied to a digital signal processing circuit 16.

The digital signal processing circuit 16 is supplied with the above-described clock pulse as well as a blanking pulse inputted from an input terminal. The digital signal processing circuit 16 replaces the digital data supplied from the A/D converters 12 by another data during the blanking period by connecting the switches controlled by the inputted blanking pulse to B terminals shown in FIG. 2. This data is an offset data b (e.g., a digital data representative of "15") entered from an input terminal during the blanking period.

During the black balance adjustment of a luminance signal and chrominance signals, switches 65 are connected to terminals D upon reception of an adjustment signal entered from an input terminal. Therefore, during the adjustment, digital R, G, and B signals indicating "15" during the blanking period are supplied to D/A converters 14 by changing the connection of the switches 35 to terminals D shown in FIG. 4, and converted into analog R, G, and B signals to be outputted. The voltage setting levels of variable voltage sources 15 are adjusted by the levels of the outputted analog R, G, and B signals to thereby change the clamp levels. In this manner, the blank level is made to become coincident with the black levels of the analog R, G, and B signals inputted from the input terminals, to thereby conduct the black balance adjustment between the luminance signal and the chrominance signals.

During the black balance adjustment, the digital data having a level lower than the blanking level (i.e., voltage level "15") can be monitored so that it is easy to confirm that the black levels of the inputted analog R, G, and B signals are lower than the blanking level because of particular clamp setting levels. In this manner, the black balance adjustment can be performed correctly and easily.

The digital R, G, and B signals with the black balance adjusted are supplied to a luminance matrix circuit 62 and chrominance matrix circuit 63 to generate a digital luminance signal and R-Y and B-Y digital chrominance signals. The digital chrominance signals R-Y and B-Y are supplied to D/A converters 14 via switches 65 which are controlled by the adjustment signal and connected to C terminals shown in FIG. 4. The digital luminance signal is supplied to an D/A converter 14 via a subtracter 64 and a switch 61 controlled by the blanking pulse, the digital luminance signal being set to a predetermined offset level during the blanking period to adjust the black level of the luminance signal relative to the blanking level in the similar manner as of FIG. 2. The predetermined offset level is calculated from an offset data (e.g., a digital data representative of a voltage level "7") c entered from an input terminal and the offset data b. In this case, the predetermined offset level is a digital data representative of a voltage level "8"="15"−"7".

The digital luminance signal, R-Y and B-Y digital chrominance signals supplied to the D/A converters 14 are converted into analog image signals synchronously with the clock pulse inputted from an input terminal and outputted externally.

During the black level adjustment, it is possible to monitor a digital data having a lower level than the blanking level (e.g., a voltage level "15"), allowing correct and easy black level adjustment.

In the above embodiments, although the blanking level offset is set to "15" and the adjustment level of the black level of the luminance signal relative to the blanking level is set to "7", these values may be set as desired.

As described above, according to the present embodiment, the black level adjustment of color image signals can be performed correctly and easily using a simple circuit arrangement.

What is claimed is:

1. An image signal processing apparatus for processing an image signal, comprising:
    (a) clamping means for clamping an input analog image signal to a desired clamp level;
    (b) analog/digital converting means for converting said analog image signal clamped by said clamping means into a digital image signal; and
    (c) digital signal processing means including offset means for offsetting a level of a blanking period of said digital color image signal output from said analog/digital converting means to a first level, for adjusting a black level of said analog color image signal by adjusting the clamp level of said clamping means using the digital image signal output from said offset means and converting said first level of the blanking period of said digital image signal converted by said analog/digital converting means from the analog image signal clamped by said clamping means whose level has been adjusted by the black adjustment, to a second level.

2. An image signal processing apparatus according to claim 1, wherein said digital signal processing means is arranged to subtract a signal whose level corresponds to said first level, from said digital image signal offset to said first level during said blanking period by said offset means and corresponding to said analog image signal with said black level having been adjusted, so as to change said first level to said second level of said digital image signal during said blanking period.

3. An image signal processing apparatus according to claim 1, wherein said image signal includes a color image signal.

4. An image signal processing apparatus according to claim 3, wherein said offset means is arranged to replace a signal having said first level to which the blanking period of said digital image signal corresponding to the luminance component of said analog image signal whose black level has been adjusted, with a signal having said second level, so as to change said first level of said blanking period of said digital image signal to said second level.

5. An image signal processing apparatus for processing an image signal comprising:
   (a) clamping means for clamping an inputted analog image signal to a desired clamp level;
   (b) analog/digital converting means for converting said analog image signal clamped by said clamping means into a digital image signal; and
   (c) digital signal processing means for offsetting said digital image signal outputted from said analog/-digital converting means to a first level during a blanking period, adjusting said clamp level of said clamping means by using said digital image signal offset to said first level during said blanking period, to adjust the black level of the blanking period of said digital image signal corresponding to said analog signal whose black level has been adjusted, to a second level, and outputting said digital image signal having said second level; and
   (d) second digital signal processing means for digitally processing said digital image signal outputted from said digital signal processing means in a different manner from said digital signal processing means, and outputting said processed digital image signal.

6. An image signal processing apparatus according to claim 5, further comprising digital/analog converting means for converting said digital image signal outputted from said second digital signal processing means into an analog image signal.

7. An image signal processing apparatus for processing an image signal, comprising:
   (a) clamping means for clamping an input analog color image signal to a desired clamp level;
   (b) analog/digital converting means for converting said analog image signal clamped by said clamping means into a digital image signal; and
   (c) digital signal processing means including offset means for offsetting a level of a blanking period of said digital color image signal output from said analog/digital converting means to a first level, for adjusting a black level of said analog color image signal by adjusting the clamp level of said clamping means using the digital color image signal output from said offset means and converting said first level of the blanking period of said digital color image signal converted by said analog/digital converting means from the analog color image signal clamped by said clamping means whose level has been adjusted by the black adjustment, to a second level.

8. An image signal processing apparatus according to claim 7, wherein said color image signal includes R, G, and B signals.

9. An image signal processing apparatus according to claim 8, wherein said clamping means includes:
   (a) a first clamp circuit for clamping an inputted analog R signal to a desired clamp level;
   (b) a second clamp circuit for clamping an inputted analog G signal to a desired clamp level; and
   (c) a third clamp circuit for clamping an inputted analog B signal to a desired clamp level.

10. An image signal processing apparatus according to claim 9, wherein said analog/digital converting means includes:
    (a) a first analog/digital conversion circuit for converting said analog R signal clamped by said first clamp circuit into a digital R signal;
    (b) a second analog/digital conversion circuit for converting said analog G signal clamped by said second clamp circuit into a digital G signal; and
    (c) a third analog/digital conversion circuit for converting said analog B signal clamped by said third clamp circuit into a digital B signal.

11. An image signal processing apparatus according to claim 10, wherein said offset means is arranged to replace the blanking period of said digital R, G and B signals output from said first, second and third clamp circuits, with a signal having said first level, and to output said digital R, G and B signals having said first level.

12. An image signal processing apparatus according to claim 10, wherein said offset means is arranged to offset digital R, G and B signals output from said first, second and third clamp circuits to said first level during said blanking period, and outputting said digital R, G and B signals having said first level during said blanking period.

13. An image signal processing apparatus according to claim 12, wherein said digital signal processing means further includes:
    (a) digital luminance signal generating means for generating a digital luminance signal using said digital R, G and B signals output from said offsetting means, and outputting said digital luminance signal;
    (b) digital chrominance signal generating means for generating two digital chrominance signals using said digital R, G and B signals output from said offsetting means, and outputting said two digital chrominance signals; and
    (c) level converting means for changing said first level of said digital luminance signal output from said digital luminance signal generating means, to a second level during said blanking period, and outputting said digital luminance signal having said second level.

14. An image signal processing apparatus according to claim 13, further comprising first digital/analog converting means for converting said digital luminance signal outputted from said level converting means into an analog luminance signal, and second digital/analog converting means for converting said digital chrominance signal outputted from said digital chrominance signal generating means into an analog chrominance signal.

15. An image signal processing apparatus according to claim 13, wherein said level converting means is arranged to replace a signal having said first level of the blanking period of said digital luminance signal outputted from said digital luminance signal generating means, with a signal having said second level, and to output the digital luminance signal having said second level.

* * * * *

UNITED STATES PATENT AND TRADEMARK OFFICE
CERTIFICATE OF CORRECTION

PATENT NO. : 5,345,279
DATED : September 6, 1994
INVENTOR(S) : KAN TAKAIWA, ET AL.

Page 1 of 2

It is certified that error appears in the above-identified patent and that said Letters Patent is hereby corrected as shown below:

ON TITLE PAGE

Under FOREIGN PATENT DOCUMENTS "220894 6/1987 European Pat. Off." should read --220894 5/1987 European Pat. Off.--.

COLUMN 2

Line 25, "generates" should read --generate--.
Line 34, "convert" should read --converter--.
Line 60, "1" should be deleted.
Line 63, "cuit" should read --cuit 32--.

COLUMN 3

Line 14, "2," should read --12,--.
Line 49, "10" should be deleted.

COLUMN 5

Line 37, "input ted" should read --inputted--.

COLUMN 6

Line 11, "signals ." should read --signals.--.
Line 14, "FIG. 4 ." should read --FIG. 4.--.
Line 34, ""15") ," should read --"15"),--.
Line 54, "color" should be deleted.
Line 56, "color" should be deleted.

UNITED STATES PATENT AND TRADEMARK OFFICE
CERTIFICATE OF CORRECTION

PATENT NO. : 5,345,279

DATED : September 6, 1994

INVENTOR(S) : KAN TAKAIWA, ET AL.

It is certified that error appears in the above-identified patent and that said Letters Patent is hereby corrected as shown below:

<u>COLUMN 7</u>

Line 30, "level of the" should read --level of said analog image signal, and changing said first level of the--.
    Line 50, "analog" should read --analog color--.
    Line 51, "digital" should read --digital color--.

Signed and Sealed this

Twenty-fourth Day of January, 1995

Attest:

BRUCE LEHMAN

*Attesting Officer*    *Commissioner of Patents and Trademarks*